United States Patent
Carnes et al.

(10) Patent No.: US 8,463,331 B2
(45) Date of Patent: Jun. 11, 2013

(54) DETERMINISTIC CHARACTERIZATION AND REDUCTION OF ACOUSTIC ECHO

(75) Inventors: Michael Carnes, San Francisco, CA (US); Jerome Tu, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1266 days.

(21) Appl. No.: 12/056,606

(22) Filed: Mar. 27, 2008

(65) Prior Publication Data

US 2009/0247239 A1 Oct. 1, 2009

(51) Int. Cl.
*H04M 9/08* (2006.01)

(52) U.S. Cl.
USPC ............... 455/570; 379/406.01; 379/406.04; 370/286; 370/289

(58) Field of Classification Search
USPC .............. 455/570; 379/406.01, 410; 370/286; 381/97.1
See application file for complete search history.

(56) References Cited

U.S. PATENT DOCUMENTS

| | | | |
|---|---|---|---|
| 6,163,608 A * | 12/2000 | Romesburg et al. | 379/406.01 |
| 7,907,977 B2 * | 3/2011 | Fratila | 455/570 |
| 2003/0031315 A1 * | 2/2003 | Belt et al. | 379/406.01 |
| 2009/0088223 A1 * | 4/2009 | Fratila | 455/570 |

* cited by examiner

*Primary Examiner* — April G Gonzales (57) ABSTRACT

Techniques to characterize and reduce acoustic echo are described. For example, a mobile computing device may comprise an audio characterization module to send a first signal to a first component and receive a second signal from a second component. The first signal may be a deterministic audio training sequence and the second signal may be a recovered audio training sequence. The audio characterization module compares the first signal and the second signal to determine an audio echo path. Other embodiments are described and claimed.

19 Claims, 6 Drawing Sheets

- SEND A FIRST SIGNAL COMPRISING A DETERMINISTIC AUDIO TRAINING SEQUENCE TO A FIRST COMPONENT
  302
- RECEIVE A SECOND SIGNAL COMPRISING A RECOVERED AUDIO TRAINING SEQUENCE FROM A SECOND COMPONENT
  304
- COMPARE THE FIRST SIGNAL AND THE SECOND SIGNAL TO DETERMINE AN AUDIO ECHO PATH
  306

DETERMINISTIC CHARACTERIZATION AND REDUCTION OF ACOUSTIC ECHO

BACKGROUND

A mobile computing device such as a combination handheld computer and mobile telephone or smart phone generally may be used in a number of different environments. As the functionality of mobile computing devices continues to increase and the form factor of mobile computing devices continues to evolve, mobile computing devices will continue to be used in a growing number of different environments and for different purposes that require audio clarity. One major obstacle to achieving consistent audio clarity is acoustic echo resulting, typically, from the microphone of a mobile computing device detecting or picking up the sound emanating from the speaker of the same mobile computing device. The acoustic echo changes based on the environment in which the mobile computing device is being used and the manner in which the mobile computing device is being used. It is desirable, therefore, for mobile computing devices to effectively reduce the amount of echo introduced as a result of the environment and manner in which the mobile computing device is being used. Consequently, there exists a substantial need for techniques to improve echo path characterization and reduction in mobile computing devices.

DETAILED DESCRIPTION

Acoustic echo is a common problem in mobile computing devices. The problem is especially prevalent when mobile computing devices are utilized in a speakerphone mode or in any other arrangement in which the sound emanating from a speaker of the mobile computing device is being picked up by a microphone of the mobile computing device resulting in acoustic echo. The problem exists in any communications scenario where there is a speaker and a microphone. Examples of acoustic echo are found in common environments in which mobile computing devices are used, including hands-free car phone systems, a standard mobile computing device in speakerphone or hands-free mode, as a result of physical coupling, e.g. vibrations of the speaker transferring to the microphone via the casing or enclosure of the mobile computing device, headset systems, e.g. Bluetooth or wired headsets, cordless phones and VoIP phones.

The difficulties in cancelling or reducing acoustic echo stem from the alteration of the original sound emitted by the speaker of the mobile computing device by the ambient space and detected by the microphone of the mobile computing device. The changes in the original audio signal can include certain frequencies being absorbed by soft furnishings, differing angles of reflection off of hard surfaces and different strengths of reflection, for example.

Current techniques to reduce the effects of acoustic echo typically depend on echo cancellation algorithms that empirically adapt to or characterize the echo path detected by the mobile computing device. These algorithms often have difficulty handling the wide array of possible echo scenarios, including differing time delays, phase changes, number of echo paths, echo tail length, and the different echo environments, such as use in an automobile, office, auditorium, home, or around bare walls, for example.

Conventional echo cancellation algorithms do not use a priori knowledge of the echo environment to initialize operating parameters of a mobile computing device to combat acoustic echo. In contrast, conventional algorithms rely on slowly adapting algorithms that eventually converge to an approximation of the echo environment. The problem with existing algorithms is that convergence to proper parameters may be slow and inaccurate leading to unsatisfactory reduction in acoustic echo. Additionally, some existing characterization algorithms may use tones to sound out the environment. However, these tones are audible and may be distracting to the user of a mobile computing device. Consequently, there exists a substantial need for techniques to improve echo path characterization and reduction.

Various embodiments may be generally directed to echo path characterization and reduction for a mobile computing device, such as a smart phone. Some embodiments may be particularly directed to audio characterization techniques for a mobile computing device based on a deterministic audio training sequence.

In one embodiment, for example, a mobile computing device may include an audio characterization module and at least a first component and a second component. In various embodiments, the audio characterization module sends a first signal to the first component and receives a second signal from the second component. One example of the first and second components may comprise a speaker and a microphone respectively. In various embodiments, the audio characterization module may compare the first signal and the second signal to determine an audio echo path and use this information to configure an echo cancellation algorithm.

The mobile computing device may further include a processor coupled to the speaker and the microphone. The processor may be operative to execute the audio characterization module. The mobile computing device may further include a memory coupled to the processor. The memory may be operative to store the audio characterization module. Other embodiments are described and claimed.

Reducing the amount of acoustic echo received at a mobile computing device using a deterministic audio training sequence may have several advantages. For example, if a user involved in a telephone conversation using their mobile computing device changes locations, e.g. the user walks from a first room to a second room, the acoustic echo characteristics of the environment may change. In this situation, it would be advantageous for the mobile computing device to quickly adapt to the new echo environment to avoid any disruption in the telephone call quality experienced by the user. Adjusting parameters of the mobile computing device using a known training sequence may allow the mobile computing device to accommodate readily changing echo environments and enhance the performance and user experience of the mobile computing device. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1A:
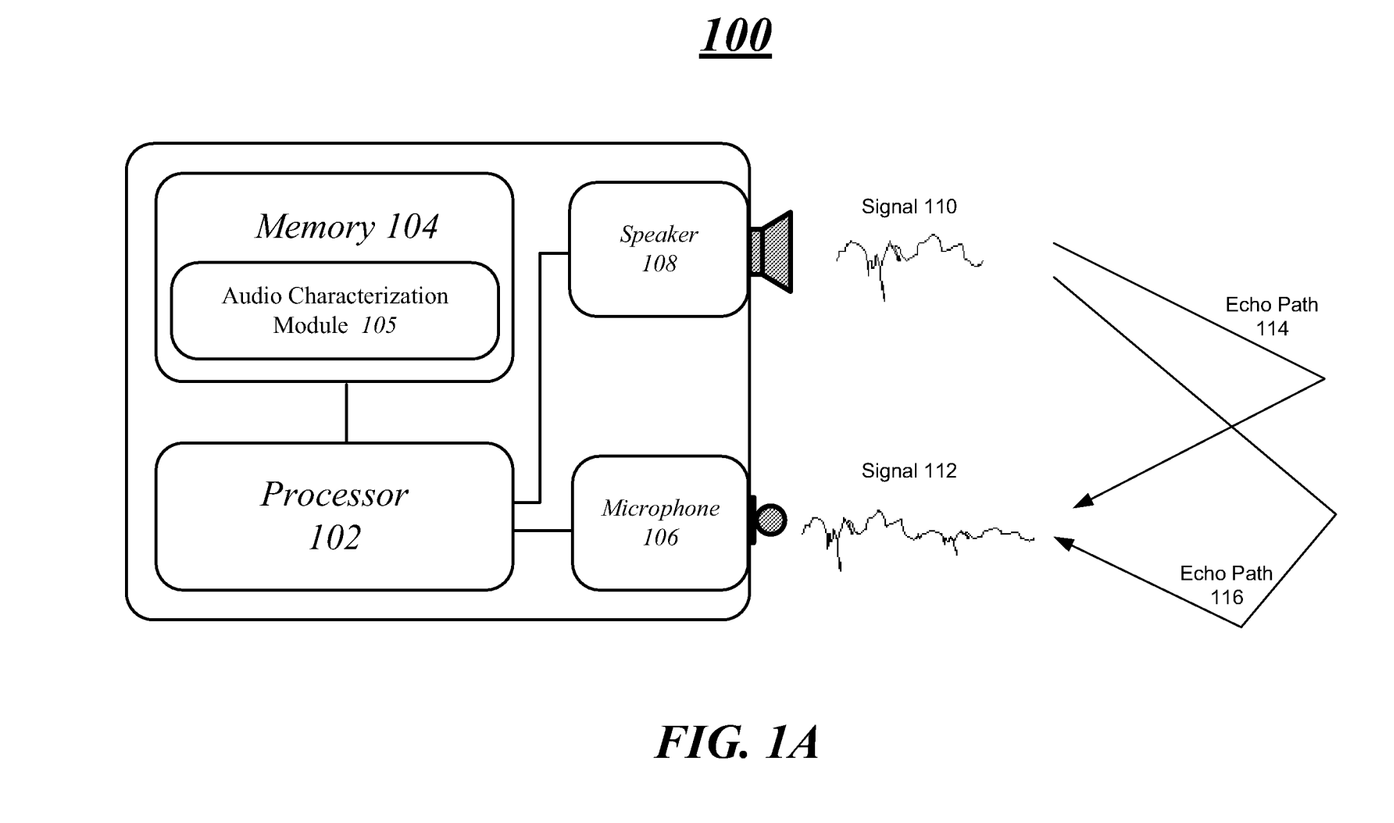
FIG. 1A illustrates one embodiment of a first mobile computing device.

FIG. 1A illustrates one embodiment of an apparatus. In particular, FIG. 1A shows a first embodiment of a mobile computing device 100. The mobile computing device 100 may include by way of example and not limitation a processor 102, a memory 104, an audio characterization module 105, a microphone 106 and a speaker 108. These elements or portions of these elements may be implemented in hardware, software, firmware, or in any combination thereof. The embodiments are not limited to these depicted elements.

The mobile computing device 100 may be generally configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, cordless phone, wireless headset, wired headset, VoIP phone and so forth. Additional details for a mobile computing device may be described in more detail with reference to FIG. 4.

The processor 102 may comprise a general purpose processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 104 may comprise computer-readable media such as volatile or non-volatile memory units arranged to store programs and data for execution by the processor 102. As depicted in FIG. 1A, the memory 104 may store an audio characterization module 105 in the form of executable program instructions, code or data. The processor 102 may retrieve and execute the program instructions, code or data from the memory 104 to control or provide audio characterization operations for the mobile computing device 100. Although the audio characterization module 105 is shown as part of the memory 104 for execution by the processor 102, it may be appreciated that the audio characterization module 105 may be stored and executed by other memory and processing resources available to the mobile computing device 100. Further, although the audio characterization module 105 is depicted as software executed by a processor, it may be appreciated that the operations for the audio characterization module 105 may be implemented in hardware as well using one or more integrated circuits, for example. The embodiments are not limited in this context.

The microphone 106 may comprise any acoustic-to-electric transducer or sensor that converts sound into an electrical signal. In various embodiments, microphone 106 may comprise a dynamic microphone, condenser microphone, or any other type of microphone suitable for use in converting audio signals into electrical signals to be processed by mobile computing device 100. While microphone 106 is shown as part of mobile computing device 100 by way of example, it should be understood that microphone 106 may comprise a microphone that is not part of mobile computing device 100 in various embodiments. In various embodiments, microphone 106 may comprise a microphone that is located remote from mobile computing device 100 and is communicably coupled to mobile computing device 100. For example, microphone 106 may comprise a microphone that is part of a Bluetooth headset or hands-free car kit communicably coupled to mobile computing device 100. Other embodiments are described and claimed.

Speaker 108 may comprise one or more electromechanical transducers that convert an electrical signal to sound. Speaker 108 may be configured to provide stereophonic or monophonic sound, for example. In various embodiments, speaker 108 may comprise one or more speakers. In various embodiments, a first speaker may be configured for a close range audio mode and a second speaker may be configured for a speakerphone audio mode. In various embodiments, the first or second speaker may be located remote from the mobile computing device 100. For example, the first or second speaker may be located in a Bluetooth headset or hands-free car kit communicably coupled to mobile computing device 100.

In general operation, the mobile computing device 100 may comprise an audio characterization module 105 to send a first signal to a first component and receive a second signal from a second component. The first signal may comprise a deterministic audio training sequence sent from audio characterization module 105 to the first component in various embodiments. The first component may comprise a speaker such as speaker 108, for example. The deterministic audio training sequence may comprise, for example, comfort noise configured as artificial background noise. The comfort noise may be configured to reduce audible disturbance to a user while the mobile computing device is in use in various embodiments.

In various embodiments, the second signal may comprise a recovered audio training sequence received at audio characterization module 105 from the second component. The second component may comprise a microphone such as microphone 106, for example.

Audio characterization module 105 may be configured to compare the first signal and the second signal to determine an audio echo path in some embodiments. Comparing the first signal and the second signal may further comprise correlating the first signal and the second signal to determine an echo environment model. Examples of the parameters associated with an echo environment model may include one or more echo paths, a delay time for the one or more echo paths, one or more echo tail lengths or an amplitude and phase for the one or more echo paths. It can be appreciated that other suitable parameters associated with an echo environment model may be used in accordance with the described embodiments.

In various embodiments, audio characterization module 105 may configure an echo cancellation algorithm based on the echo environment model determined from the correlation of the first and second signals. In response to the configured echo cancellation algorithm, audio characterization module 105 may select an operating mode for the mobile computing device 100 or initialize parameters of an echo canceller or echo suppressor. In various embodiments, the parameters of the echo canceller may include at least one of a delay time, tail length, adaptation step size, adaptation speed, gain or loop bandwidth. It can be appreciated that other suitable echo canceller parameters may be used in accordance with the described embodiments.

Figure 1B:
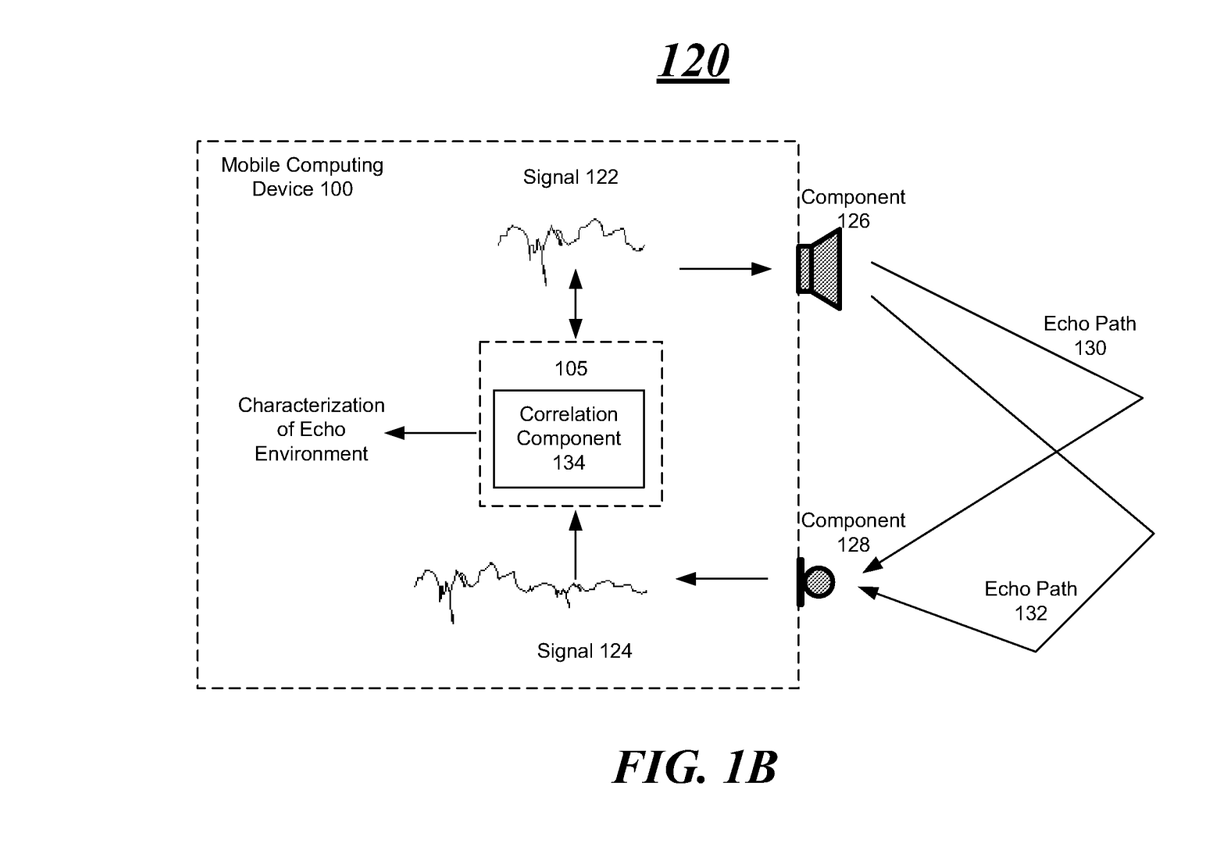
FIG. 1B illustrates one embodiment of an echo environment.

FIG. 1B illustrates one embodiment of a signal flow diagram in an echo environment including mobile computing device 100. In particular, FIG. 1B shows an echo environment 120 including by way of example and not limitation a mobile computing device 100, an audio characterization module 105, a first signal 122, a second signal 124, a first component 126, a second component 128, a first echo path 130, a second echo path 132 and a correlation component 134. In various embodiments, the mobile computing device 100, audio characterization module 105, first component 126, second component 128 and correlation component 134 may be implemented as part of mobile computing device 100 of FIG. 1A. For example, component 126 may comprise speaker 108 of FIG. 1A, component 128 may comprise microphone 106 of FIG. 1A and correlation component 134 may be implemented as part of audio characterization module 105 of FIG. 1A. While correlation component 134 is shown as being included as part of audio characterization module 105 by way of example, it should be understood that correlation component 134 could be implemented as a separate component and still fall within the scope of the described embodiments. Other embodiments are described and claimed.

In various embodiments, signal 122 may comprise a deterministic or known audio training sequence sent from an audio characterization module to a speaker and to correlation component 134. Sending signal 122 to both component 126 and correlation component 134 allows for a known comparison or correlation between signal 122 and signal 124, which is described in more detail below. Signal 122 may comprise, for example, a deterministic audio training sequence sent from audio characterization module 105 to speaker 108 of FIG. 1A. Signal 122 may comprise any deterministic or known audio training sequence, such as comfort noise or background noise that can be used to sound out an echo environment and not interfere with the quality of the audio signal detected by a user of the mobile computing device.

In various embodiments, signal 122 may comprise a deterministic audio training sequence configured to reduce audible disturbance to a user while the mobile computing device 100 is in use. For example, signal 122 may comprise background noise or comfort noise having an amplitude sufficient to sound out the echo environment while not being distracting to a user of the mobile computing device. In various embodiments, signal 122 will have a wide frequency range to accurately characterize the echo environment and will be sufficiently long in duration to ensure sufficient processing gain.

Signal 122 is sent from audio characterization module 105 to component 126. Component 126 in turn converts the signal into an acoustic audio signal that enters the echo environment 120. Echo environment 120 may comprise any environment in which a mobile computing device could be operated. For example, echo environment 120 may comprise the inside of an automobile, the outdoors, indoors with exposed brick walls, an auditorium, etc. The acoustic characteristics of the echo environment will differ from echo environment to echo environment. As a result, echo paths 130 and 132 will differ in each respective echo environment and when mobile computing device is utilized in different configuration or locations in each echo environment. While only two echo paths 130, 132 are shown by way of example, it should be understood that any number of echo paths may exist for purposes of the described embodiments.

In various embodiments, signal 122 traverses echo environment 120 along a number of echo paths, such as echo paths 130 and 132 for example, and arrives at component 128. Component 128 may comprise a microphone such as microphone 106 of FIG. 1A configured to receive the acoustic signal and convert that signal into a digital signal such as signal 124. Signal 124 represents a transformed version of signal 122 that has been distorted in part as a result of echo environment 120 and the one or more echo paths over which it has traveled.

Signal 124 is then passed to correlation component 134 of audio characterization module 105 where it is compared to or correlated with signal 122. The correlation may be processed by any suitable form of signal processing such as by a digital signal processor (DSP) or a general purpose processor, for example. Because signal 122 is known to the correlation component 134, the comparison or correlation of signals 122 and 124 can occur quickly and can result in an accurate approximation of the echo environment. Based on the correlation, correlation component 134 may output a characterization of the echo environment 120 that represents an accurate model of echo environment 120 including parameters such as the number of echo paths, delay time for each path, echo tail length, or amplitude and phase of each echo path.

In various embodiments, the echo environment parameters may be used individually or collectively to configure an echo cancellation algorithm. The echo cancellation algorithm may comprise any algorithm configured to anticipate the signal being received at component 128, e.g. signal 124, and cancel it or reduce its impact on the audio quality of the mobile computing device 100. For example, based on the output of the echo cancellation algorithm, an appropriate operating mode, such as automobile operating mode or outdoor operating mode, may be selected for mobile computing device 100. In various embodiments, the output of the echo cancellation algorithm may be used to initialize parameters of an echo canceller or echo suppressor that is configured to produce a signal that is one hundred and eighty degrees out of phase with the correlated signal to eliminate or reduce the echo signal.

In various embodiments, the first signal 122 may be sent to the first component 126 during periods of inactivity at the first component 126. For example, if the speaker is inactive, the deterministic audio training sequence may be sent to the speaker. Sending the first signal 122 during silence periods at the speaker increases the likelihood that audio interference will be avoided as a result of inserting the background noise. The intermittent transmission of the training sequence allows for continual updating to reflect the changing echo environment of the mobile computing device as a result of frequent silence periods in a conventional telephone conversation. During the detected silence periods at component 126, signal 122 may be configured as comfort noise or background noise to avoid any distracting tones that a user of the mobile computing device may perceive. In various embodiments, signal 122 will be configured so that a user of the mobile computing device 100 will not aware of its existence or will not notice the signal as a distraction.

Figure 2A:
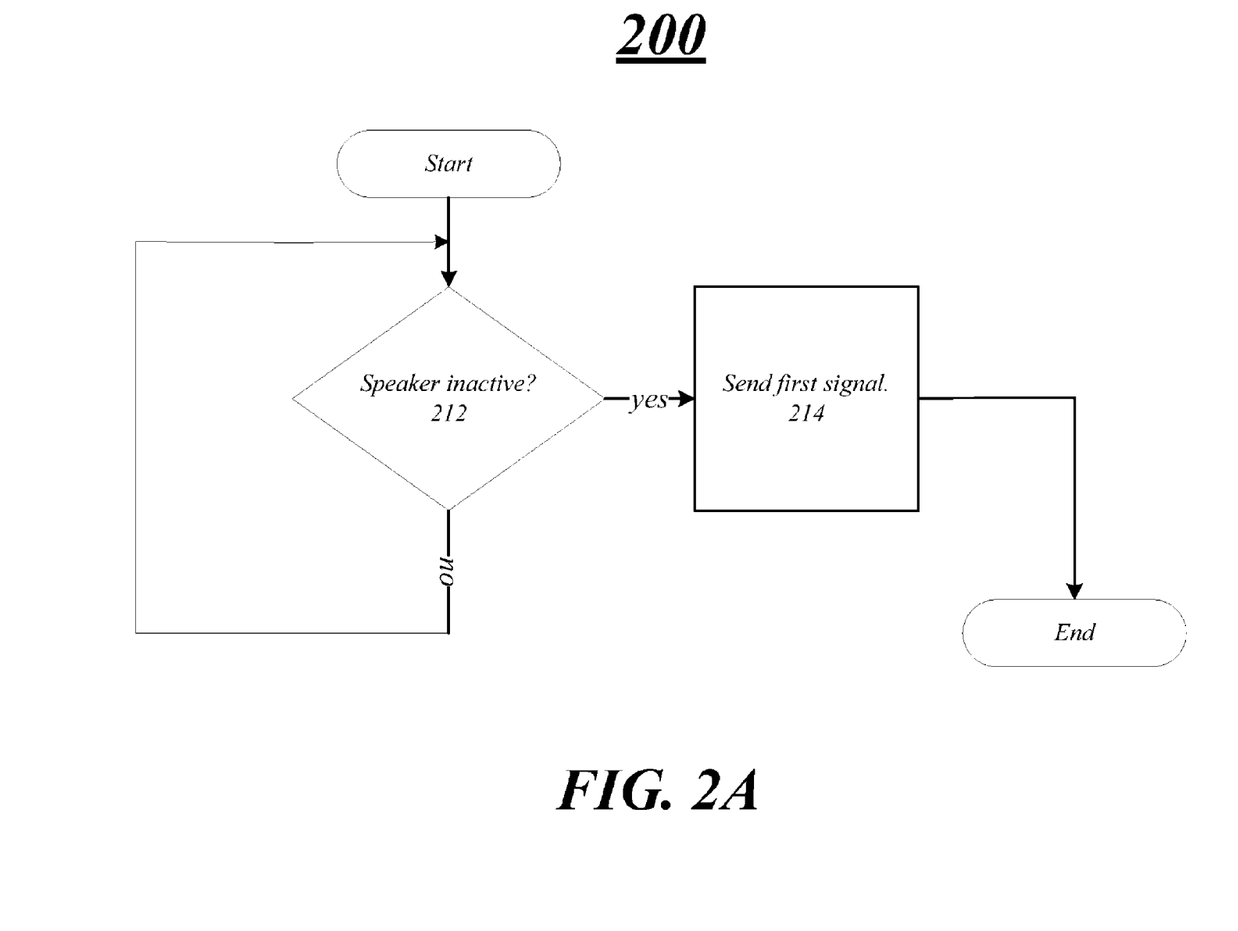
FIG. 2A illustrates one embodiment of a first logic diagram.

FIG. 2A illustrates one embodiment of a first logic diagram in which the first signal is sent to the first component during periods of silence at the first component. At 212 a determination is made regarding the status of the speaker. If the speaker is active, the monitoring of the status of the speaker continues. For example, if a conversation is taking place and a voice signal is being reproduced by the speaker, the first signal will not be sent to the speaker. If the speaker is inactive, the first signal is sent to the first component at 214. For example, during a break in a conversation, the first signal will be sent to the speaker to sound out the echo environment and adjust the mobile computing device accordingly.

In various embodiments, the first signal 122 may be continuously sent to the first component 126. For example, the deterministic audio training sequence may be sent concurrently with other audio data, such as voice conversation data. Continuous transmission of the deterministic audio training sequence allows for continuous monitoring, characterization and adaptation to changing echo environments. When continuous transmission of the deterministic audio training sequence is employed, the training sequence should be configured as comfort noise or background noise that will have a minimal impact on the quality of the audio transmission and will be minimally distracting to a user of the mobile computing device. Other embodiments are described and claimed.

Figure 2B:
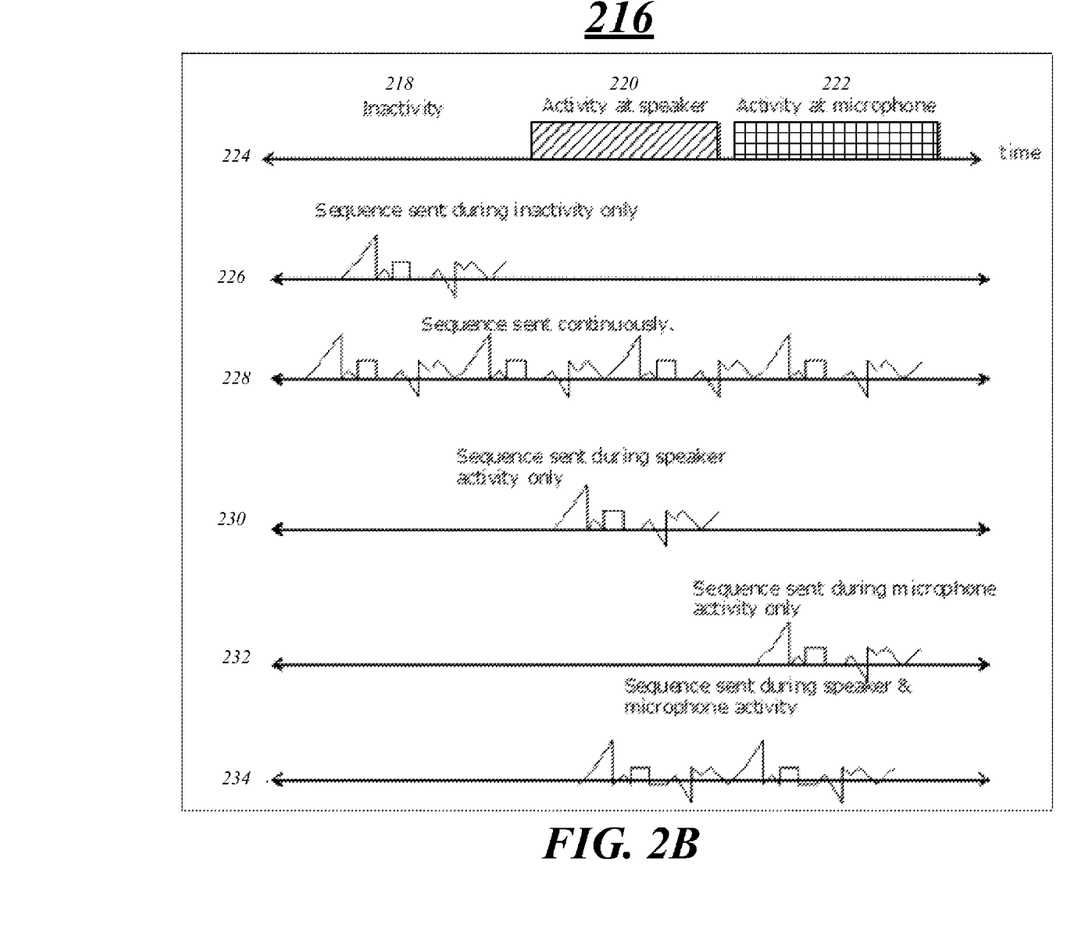
FIG. 2B illustrates one embodiment of a timing diagram.

While a limited number of embodiments in which the first signal 122 is sent to the first component 126 are described above, it should be understood that the first signal 122 may be sent to the first component 126 at various times and still fall with the described embodiments. FIG. 2B illustrations one embodiment of a timing diagram illustrating various times in which a training sequence can be sent to a speaker. For example, diagram 216 may illustrate various times in which first signal 122 may be sent to first component 126 of FIG. 1. Other embodiments are described and claimed.

In various embodiments, the activity level of the components of a mobile computing device may change with time. For example, as shown at 224, there may be periods of inactivity at 218 when no signals are being sent to the speaker and no signals are being received at the microphone. At 220, activity may occur at the speaker only and at 222, activity may occur at the microphone only. In various embodiments, combinations of the various activity levels are possible. For example, a user of mobile computing device 100 may speak into microphone 106 and simultaneously listen to a signal being reproduced by speaker 108.

In some embodiments, as shown at 226, a signal may be sent during periods of inactivity 218. For example, when both the speaker 108 and microphone 106 of mobile computing device 100 are inactive, a deterministic audio training sequence may be sent to speaker 108. At 228, a signal may be sent continuously during any of inactivity 218, activity at speaker 220, activity at microphone 222 or any combination of these situations. For example, a deterministic audio training sequence may be sent to speaker 108 continuously during periods of silence in a conversation, during periods when a signal is being reproduced by speaker 108, during periods when a signal is detected by microphone 106, and during periods when both a signal is reproduced by speaker 108 and a signal is detected by microphone 106.

In various embodiments, as shown at 230, a signal may be sent during periods of activity at the speaker only 220. For example, when the speaker 108 is reproducing a signal, a deterministic audio training sequence may be sent to speaker 108. At 232, a signal may be sent during periods of activity at the microphone only 222. For example, when a microphone 106 of mobile computing device 100 is detecting a signal, a deterministic audio training sequence may be sent to speaker 108. In some embodiments a signal may be sent during periods of activity at speaker 220 and during periods of activity at microphone 222 as shown at 234. For example, a deterministic audio training sequence may be sent to speaker 108 during periods of activity at speaker 108 and activity at speaker 106. Other embodiments are described and claimed.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 3:
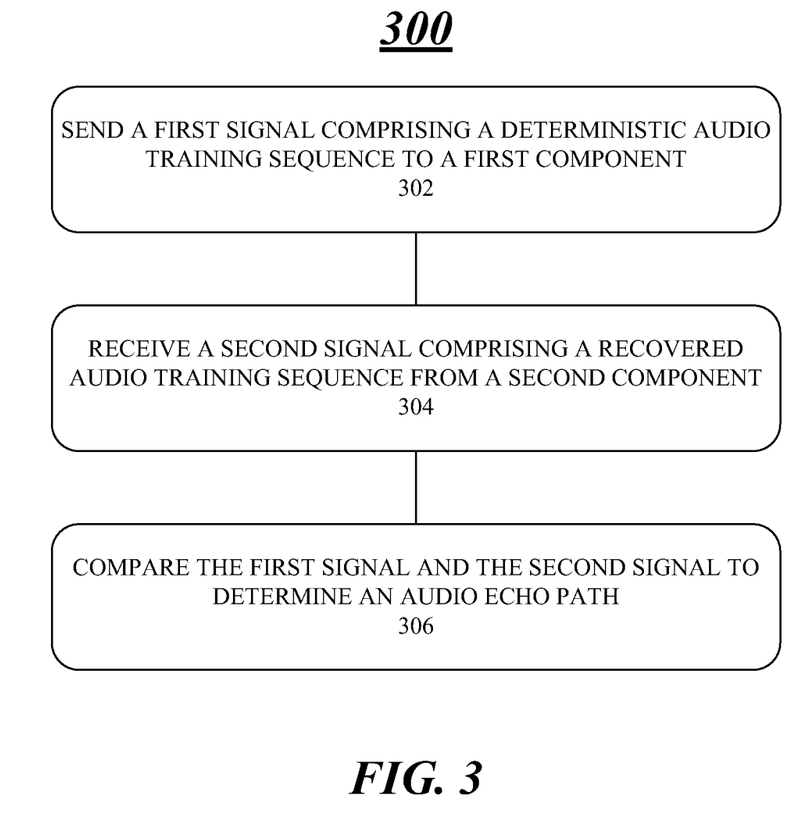
FIG. 3 illustrates one embodiment of second logic diagram.

FIG. 3 illustrates a second embodiment of a logic diagram. In particular, FIG. 3 illustrates a logic diagram 300, which may be representative of the operations executed by one or more embodiments described herein. As shown in the FIG. 3, a first signal comprising a deterministic audio training sequence may be sent to a first component at 302. For example, a deterministic audio training sequence, such as signal 110, may be sent from audio characterization module 105 to speaker 108 in FIG. 1A. At 304, a second signal comprising a recovered audio training sequence may be received at a second component. For example, signal 112 may be received at microphone 106 in FIG. 1A. The first signal and the second signal may be compared to determine an audio echo path at 306. For example, audio characterization module 105 may compare signals 110 and 112 to accurately determine echo paths 114 and 116.

In various embodiments, the deterministic audio training sequence may comprise comfort noise configured as artificial background noise and configured to reduce audible disturbance to a user of the mobile computing device. For example, the comfort noise signal may have an amplitude selected to avoid or reduce interference with a voice telephone conversation taking place using mobile computing device 100.

In one embodiment, the first signal and the second signal may be correlated to determine an echo environment model. For example, mobile computing device 100 may be used in an automobile having a distinct echo environment. Based on the correlation between the first and second signals, correlation component 134 of FIG. 1B may be able to determine that the mobile computing device is currently being operating in an automobile, for example, and appropriate adjustments may be made to the audio settings of the mobile computing device.

In various embodiments, an echo cancellation algorithm may be configured based on the determined echo environment model, including selecting an operating mode or initializing parameters of an echo canceller or suppressor. For example, in the automobile use example described above, an automobile operating mode that has parameters specifically directed to the reduction of echo signals associated with use in an automobile may be selected based on the results of the application of the echo cancellation algorithm.

The first signal may be sent to the first component during periods of inactivity at the first component in various embodiments. For example, when speaker 108 is inactive, audio characterization module 105 may send signal 110 to speaker 108. In various embodiments, the first signal may be continuously sent to the first component. For example, audio characterization module 105 may continuously send a deterministic audio training sequence to speaker 108 in addition to any other audio information sent to speaker 108, such as the voice of a user of mobile computing device 100 for example. Other embodiments are described and claimed.

Figure 4:
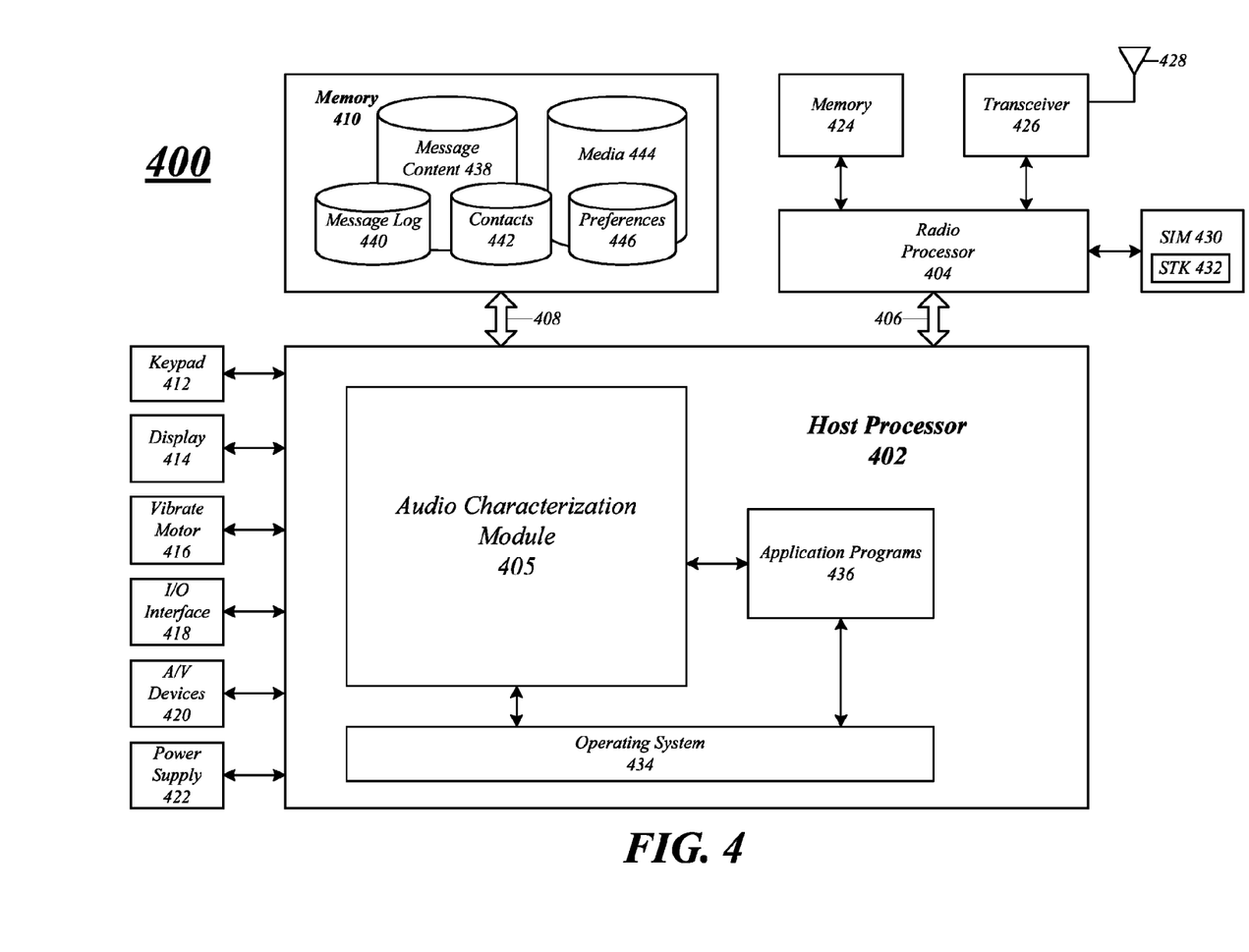
FIG. 4 illustrates one embodiment of a second mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alpha-numeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include an audio characterization module 405. The audio characterization module 405 may the same or similar to the audio characterization module 105 described with reference to FIGS. 1A and 1B.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
an audio characterization module to:
send a first signal to a first component and receive a second signal from a second component, the first signal comprising a deterministic audio training sequence and the second signal comprising a recovered audio training sequence;
compare the first signal and the second signal to determine an audio echo path;
correlate the first signal and the second signal to determine an echo environment model; and
configure an echo cancellation algorithm based on the determined echo environment model.

2. The mobile computing device of claim 1, the deterministic audio training sequence comprising comfort noise configured as artificial background noise.

3. The mobile computing device of claim 2, the comfort noise configured to reduce audible disturbance to a user when the mobile computing device is in use.

4. The mobile computing device of claim 1, the echo environment model comprising one or more echo paths, a delay time for the one or more echo paths, one or more echo tail lengths or an amplitude and phase for the one or more echo paths.

5. The mobile computing device of claim 1, wherein configuring the echo cancellation algorithm comprises selecting an operating mode or initializing parameters of an echo canceller.

6. The mobile computing device of claim 5, the parameters of the echo canceller comprising at least one of a delay time, tail length, adaptation step size, adaptation speed, gain or loop bandwidth.

7. The mobile computing device of claim 1, the first component comprising a speaker and the second component comprising a microphone.

8. The mobile computing device of claim 1, wherein the first signal is sent to the first component during periods of inactivity at the first component, periods of inactivity at the second component or periods of inactivity at the first and second components.

9. The mobile computing device of claim 1, wherein the first signal is continuously sent to the first component or the first signal is sent to the first component during periods of activity at the first and second components.

10. A method, comprising:
sending a first signal comprising a deterministic audio training sequence to a first component;
receiving a second signal comprising a recovered audio training sequence from a second component; and
comparing the first signal and the second signal to determine an audio echo path;
correlating the first signal and the second signal to determine an echo environment model; and
configuring an echo cancellation algorithm based on the determined echo environment model.

11. The method of claim 10, the deterministic audio training sequence comprising comfort noise configured as artificial background noise and configured to reduce audible disturbance.

12. The method of claim 10, wherein configuring an echo cancellation algorithm comprises selecting an operating mode or initializing parameters of an echo canceller.

13. The method of claim 10, further comprising sending the first signal to the first component during periods of inactivity at the first component, periods of inactivity at the second component or periods of inactivity at the first and second components.

14. The method of claim 10, further comprising continuously sending the first signal to the first component or sending the first signal to the first component during periods of activity at the first and second components.

15. An article of manufacture comprising a non-transitory computer-readable storage medium containing instructions that, when executed by a processor, enable a system to:
send a first signal comprising a deterministic audio training sequence to a first component;
receive a second signal comprising a recovered audio training sequence from a second component; and
compare the first signal and the second signal to determine an audio echo path;
correlate the first signal and the second signal to determine an echo environment model; and
configure an echo cancellation algorithm based on the determined echo environment model.

16. The article of claim 15, further comprising instructions that if executed enable the system to:
configure the deterministic audio training sequence as comfort noise comprising artificial background noise; and
configure the comfort noise to reduce audible disturbance.

17. The article of claim 15, further comprising instructions that if executed enable the system to:
select an operating mode or initialize parameters of an echo canceller based on the echo cancellation algorithm.

18. The article of claim 15, further comprising instructions that if executed enable the system to:
send the first signal to the first component during periods of inactivity at the first component, periods of inactivity at the second component or periods of inactivity at the first and second components.

19. The article of claim 15, further comprising instructions that if executed enable the system to:
continuously send the first signal to the first component or send the first signal to the first component during periods of activity at the first and second components.

\* \* \* \* \*